US008689098B2

(12) United States Patent
Halliday et al.

(10) Patent No.: US 8,689,098 B2
(45) Date of Patent: Apr. 1, 2014

(54) SYSTEM AND METHOD FOR ORGANIZING RECORDED EVENTS USING CHARACTER TAGS

(75) Inventors: Andrew Halliday, Soquel, CA (US); Christopher Lunt, Mountain View, CA (US); Dean Pfutzenreuter, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1240 days.

(21) Appl. No.: 11/383,123

(22) Filed: May 12, 2006

(65) Prior Publication Data

US 2007/0250496 A1    Oct. 25, 2007

Related U.S. Application Data

(60) Provisional application No. 60/745,231, filed on Apr. 20, 2006.

(51) Int. Cl.
*G06F 3/00* (2006.01)
(52) U.S. Cl.
USPC .......................................................... 715/234
(58) Field of Classification Search
USPC ........................... 715/230, 255, 235, 243, 254
See application file for complete search history.

(56) References Cited

U.S. PATENT DOCUMENTS

| 5,157,768 | A | 10/1992 | Hoeber et al. |
|---|---|---|---|
| 5,287,448 | A | 2/1994 | Nicol et al. |
| 5,465,378 | A | 11/1995 | Duensing et al. |
| 5,850,219 | A | 12/1998 | Kumomura |
| 5,913,212 | A * | 6/1999 | Sutcliffe et al. .................... 707/6 |
| 5,923,325 | A | 7/1999 | Barber et al. |
| 5,938,724 | A | 8/1999 | Pommier et al. |
| 6,026,148 | A | 2/2000 | Dworkin et al. |
| 6,230,324 | B1 | 5/2001 | Tomita et al. |
| 6,340,978 | B1 | 1/2002 | Mindrum |
| 6,405,197 | B2 | 6/2002 | Gilmour |
| 6,694,302 | B2 | 2/2004 | Chuang et al. |
| 6,701,322 | B1 | 3/2004 | Green |
| 6,760,884 | B1 | 7/2004 | Vertelney et al. |
| 6,803,925 | B2 | 10/2004 | Vronay |
| 6,848,077 | B1 | 1/2005 | McBrearty et al. |
| 6,874,126 | B1 | 3/2005 | Lapidous |

(Continued)

FOREIGN PATENT DOCUMENTS

WO    WO 2006/098588    *    9/2006    ............. G06Q 99/00

OTHER PUBLICATIONS

Brush et al., "Notification for Shared Annotation of Digital Documents," Apr. 2002, pp. 89-96.*

(Continued)

*Primary Examiner* — Kyle Stork
(74) *Attorney, Agent, or Firm* — Martine Penilla Group, LLP

(57) ABSTRACT

A computer system organizes text narratives and images about events using character tags, which are tags that are defined by users with respect to those persons that are depicted in the text narratives and images. Each character tag is associated with either a user profile or a pseudo-profile. A pseudo-profile for a person is created by a user when the user does not know if the person has a user profile in the computer system. An invitation e-mail that is sent to a prospective user may include content stored in the computer system, or a hyperlink to such content, that has been tagged with the character tag of the prospective user.

11 Claims, 13 Drawing Sheets

(56) References Cited

U.S. PATENT DOCUMENTS

| | | | |
|---|---|---|---|
| 6,901,379 | B1 | 5/2005 | Balter et al. |
| 6,976,229 | B1 | 12/2005 | Balabanovic et al. |
| 6,996,782 | B2 | 2/2006 | Parker et al. |
| 7,194,411 | B2 | 3/2007 | Slotznick et al. |
| 7,213,206 | B2* | 5/2007 | Fogg .................... 715/706 |
| 7,284,191 | B2 | 10/2007 | Grefenstette et al. |
| 7,287,225 | B2 | 10/2007 | Mindrum |
| 7,305,436 | B2* | 12/2007 | Willis .................... 709/204 |
| 7,321,883 | B1 | 1/2008 | Freedy et al. |
| 7,337,172 | B2* | 2/2008 | Shapiro .................... 707/10 |
| 7,366,759 | B2 | 4/2008 | Trevithick et al. |
| 7,421,449 | B2 | 9/2008 | Williams et al. |
| 7,424,669 | B2 | 9/2008 | Bhogal et al. |
| 7,506,262 | B2 | 3/2009 | Gupta et al. |
| 7,558,853 | B2 | 7/2009 | Alcorn et al. |
| 7,567,977 | B1 | 7/2009 | White |
| 7,725,492 | B2* | 5/2010 | Sittig et al. .................... 707/784 |
| 7,810,021 | B2 | 10/2010 | Paxson |
| 8,099,433 | B2 | 1/2012 | Sittig et al. |
| 2001/0047373 | A1 | 11/2001 | Jones et al. |
| 2002/0052768 | A1* | 5/2002 | Walker et al. .................... 705/7 |
| 2002/0103822 | A1 | 8/2002 | Miller |
| 2002/0152245 | A1 | 10/2002 | McCaskey et al. |
| 2002/0169769 | A1* | 11/2002 | Jackson .................... 707/4 |
| 2002/0178185 | A1 | 11/2002 | Kuchinsky et al. |
| 2003/0046318 | A1 | 3/2003 | Schohn et al. |
| 2003/0055871 | A1 | 3/2003 | Roses |
| 2004/0143603 | A1 | 7/2004 | Kaufmann et al. |
| 2004/0153445 | A1 | 8/2004 | Horvitz et al. |
| 2004/0194034 | A1* | 9/2004 | Vlamis .................... 715/530 |
| 2004/0199867 | A1 | 10/2004 | Brandenborg |
| 2005/0055625 | A1 | 3/2005 | Kloss |
| 2005/0060166 | A1 | 3/2005 | Durham et al. |
| 2005/0182773 | A1* | 8/2005 | Feinsmith .................... 707/100 |
| 2005/0192913 | A1* | 9/2005 | Lubart .................... 705/406 |
| 2005/0193347 | A1 | 9/2005 | Van Dam |
| 2005/0197846 | A1 | 9/2005 | Pezaris et al. |
| 2005/0203801 | A1 | 9/2005 | Morgenstern et al. |
| 2005/0209887 | A1* | 9/2005 | Pollner .................... 705/3 |
| 2005/0216550 | A1* | 9/2005 | Paseman et al. .................... 709/202 |
| 2005/0216768 | A1 | 9/2005 | Eppert |
| 2005/0235062 | A1* | 10/2005 | Lunt et al. .................... 709/225 |
| 2005/0268237 | A1 | 12/2005 | Crane |
| 2005/0273378 | A1 | 12/2005 | MacDonald-Korth et al. |
| 2006/0064639 | A1 | 3/2006 | Reid et al. |
| 2006/0143043 | A1 | 6/2006 | McCallie et al. |
| 2006/0155757 | A1 | 7/2006 | Williams et al. |
| 2006/0224967 | A1 | 10/2006 | Marmaros |
| 2006/0230061 | A1 | 10/2006 | Sample et al. |
| 2006/0248086 | A1 | 11/2006 | Pahud |
| 2006/0250419 | A1 | 11/2006 | Shiba et al. |
| 2006/0253491 | A1 | 11/2006 | Gokturk et al. |
| 2006/0277477 | A1 | 12/2006 | Christenson |
| 2006/0282306 | A1 | 12/2006 | Thissen-Roe |
| 2007/0016647 | A1 | 1/2007 | Gupta et al. |
| 2007/0019849 | A1 | 1/2007 | Kaufman et al. |
| 2007/0043688 | A1* | 2/2007 | Kountz et al. .................... 707/1 |
| 2007/0067268 | A1 | 3/2007 | Dai et al. |
| 2007/0089053 | A1 | 4/2007 | Uhlig et al. |
| 2007/0174247 | A1* | 7/2007 | Xu et al. .................... 707/3 |
| 2007/0239761 | A1* | 10/2007 | Baio et al. .................... 707/102 |
| 2007/0250479 | A1 | 10/2007 | Lunt |
| 2007/0250496 | A1 | 10/2007 | Halliday |
| 2007/0250791 | A1 | 10/2007 | Halliday et al. |
| 2007/0260996 | A1 | 11/2007 | Jakobson |
| 2007/0261071 | A1 | 11/2007 | Lunt |
| 2008/0010585 | A1 | 1/2008 | Schneider et al. |
| 2008/0120345 | A1 | 5/2008 | Duncombe |
| 2008/0320547 | A1 | 12/2008 | Lupoi et al. |
| 2009/0018867 | A1 | 1/2009 | Reiner |
| 2010/0174675 | A1 | 7/2010 | Mons et al. |
| 2011/0022966 | A1 | 1/2011 | Rose et al. |
| 2012/0096037 | A1 | 4/2012 | Sittig et al. |
| 2012/0096038 | A1 | 4/2012 | Sittig et al. |

OTHER PUBLICATIONS

"Today, someone needs you. Tomorrow . . . you may need someone too," http://www.wisdomlegacy.org/HeresHowItWorks.aspx, Mar. 17, 2006.

"WebBiographies.com Enables People to Document Their Lives and Build Dynamic Family Trees," http://www.lexdon.com/article/Web-Biographies.com_Enables_People_to_Document/45013.html, Apr. 18, 2006.

Benford et al.; Designing Storytelling Technologies to Encourage Collaboration Between Young Children; ACM; 2000; pp. 556-573.

Ellis et al; Designing Palaver Tree Online: Supporting Social Roles in a Community of Oral History; ACM; 2001; pp. 474-481.

Jones; A Biographic Researcher in Pursuit of an Aesthetic: The User of Art-Based (re) Presentations in "Performative" Dissemination of Life Stories; Google; Apr. 2006; pp. 66-85.

Marrs et al; Just-In-Time Teaching in Biology: Creating an Active Learner Classroom Using the Internet; Google; 2004; pp. 49-61.

Mazalek et al; Tangible View Points: A Physical Approach to Multimedia Stories; ACM; 2002; pp. 153-160.

Radev et al; Ranking Suspected Answers to Natural Language Questions Using Predictive Annotation; Google; 2002; pp. 150-157.

U.S. Appl. No. 11/383,112, filed May 12, 2006; Andrew Halliday; Office Action issued Oct. 19, 2011.

U.S. Appl. No. 11/415,691, filed May 2, 2006; Christopher Lunt; Notice of Allowance issued Oct. 11, 2011.

U.S. Appl. No. 11/415,691, filed May 2, 2006; Christopher Lunt; Notice of Allowance issued Sep. 20, 2011.

Xu et al; Evaluation of an Extraction-Based Approach to Answering Definitional Questions; ACM; 2004; pp. 418-424.

U.S. Appl. No. 11/415,691, filed May 2, 2006; Christopher Lunt; Office Action issued Aug. 4, 2009.

U.S. Appl. No. 11/415,691, filed May 2, 2006; Christopher Lunt; Office Action issued May 19, 2011.

U.S. Appl. No. 11/383,112, filed May 12, 2006; Andrew Halliday; Office Action issued Jul. 8, 2009.

U.S. Appl. No. 11/383,112, filed May 12, 2006; Andrew Halliday; Office Action issued Apr. 22, 2011.

U.S. Appl. No. 11/383,112, filed May 12, 2006; Andrew Halliday; Office Action issued Apr. 12, 2012.

U.S. Appl. No. 11/383,134, filed May 12, 2006; Christopher Lunt; Office Action issued Sep. 17, 2009.

U.S. Appl. No. 11/383,134, filed May 12, 2006; Christopher Lunt; Office Action issued Aug. 24, 2011.

* cited by examiner

OurStory

Image

Jane Johnson
Profile  Switch Profile
Settings  Logout

My Story | Q&A | People

Add Organization

Location
Add a location for this thread into the box below:

Tags
Tags are a simple way to identify content in your posts, like keywords or topics. Enter tags for this thread into the box below:

Cancel    Add

FIGURE 3E

OurStory

Jane Johnson
Profile  Switch Profile
Settings  Logout

My Story | Q&A | People

Preview Post

Title: My first job
Timeline Date: January 2, 1962

Q: What was your first job? What was the biggest lesson learned?

*Image*  A: My very first job was picking potatoes ...

Permissions:
○ Public
○ Restricted
  ☐ Family
  ☐ Circle X
  ☐ Circle Y
  ☐ Circle Z Upload Different Image:

[Browse]

[Publish]  [Cancel]

FIGURE 3F

SYSTEM AND METHOD FOR ORGANIZING RECORDED EVENTS USING CHARACTER TAGS

CROSS-REFERENCE TO RELATED APPLICATION

This application claims the benefit of U.S. Provisional Patent Application Ser. No. 60/745,231, entitled "Collaborative System and Method for Generating Biographical Accounts," filed Apr. 20, 2006, which is herein incorporated by reference.

BACKGROUND OF THE INVENTION

1. Field of the Invention

The present invention relates generally to systems and methods for recording text narratives and images about events and, more particularly, to systems and methods for organizing the recorded text narratives and images using tags that are defined with respect to characters depicted in the text narratives and images.

2. Description of the Related Art

Tags have become a popular tool for organizing content. A tag is a keyword that is defined by the user for classifying the content. A user may define multiple tags for an object. Tags are often associated with web pages or images.

One major feature of tags is that it is user-defined. As a result, objects that cannot be parsed by a computer and automatically indexed, like images, can be indexed in accordance with user-defined tags. In addition, unlike hierarchical categorization schemes or computer generated indexing schemes, classification by tags can be highly personalized.

One example application of tags for organizing images is disclosed in U.S. Patent Application Pub. No. 2006/0064639. In this example, images are organized by tagging them with informative keywords defined by the user and grouping images together into conceptual photo albums. A selected group of images is then published into a photo book that is made available over the Internet or published as individual image prints.

A tag may be defined as public or private. A public tag is shared with other users and is linked with other users who have used the same tag, so that all objects that are associated this tag may be accessed through this tag. The sharing of public tags has been a major reason behind the expansive use of tags. Some of the popular web services that provide for public sharing of user-defined tags include Technorati™, del.icio.us, and Flickr™. A private tag, on the other hand, is not shared with other users. Only the user who created the private tag may use it to access the objects associated with private tag. Private tags are useful in allowing a user to organize information in accordance with his or her personalized classification scheme.

One limitation of tags is that different users will use different tags to describe the same item, because no rules exist to standardize the tags people will use. In essence, tagging creates an inherently ambiguous system. For example, objects associated with the tag "apple" may include web pages and images relating to fruits or web pages and images relating to the computer company. Similarly, objects associated with the tag "windows" may include web pages and images relating to openings provided in structures or web pages and images relating to a computer operating system.

SUMMARY OF THE INVENTION

Embodiments of the present invention employ tags to organize text narratives and images about events that are being maintained in a computer system, and also provide a computer system and method for using tagged information in novel ways. According to one aspect, tagged information is used in the process of inviting prospective users to the computer system. According to another aspect, tagged information is used in the process of helping users recollect and reconstruct their life stories.

In accordance with the embodiments of the present invention, text narratives and images about events are organized using various tags including character tags. Character tags are tags that are defined with respect to those persons that are depicted in the text narratives and images. Each character tag is associated with either a user profile that is created when a user registers with the computer system or a pseudo-profile. A pseudo-profile typically includes a person's name, and may also include the person's e-mail address and phone number. A pseudo-profile for a person is created by a user when the user does not know if the person has a user profile in the computer system.

When a user invites a prospective user to register with the computer system, the computer system examines if a pseudo-profile has been created by the user for the prospective user. If so, the character tag associated with this pseudo-profile is used to retrieve text narratives and images that have been indexed with this character tag. When the invitation e-mail is sent out to the prospective user, the retrieved stories and images are made available to the prospective user for viewing.

According to further embodiments of the present invention, text narratives and images that have been indexed with various tags including character tags may enable collaborative storytelling by helping users recollect and reconstruct their life stories. As a user makes inputs relating to an event in his or her life, the computer system searches the content database for potential matching events that have been depicted by other users. If a potential match is found, the computer system transmits the relevant content to the user. The potential match may be determined based on matches of location and date of the events and characters depicted in the events.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-F are schematic representations of web pages that are used in posting life stories to the web site.

DETAILED DESCRIPTION

Figure 1:
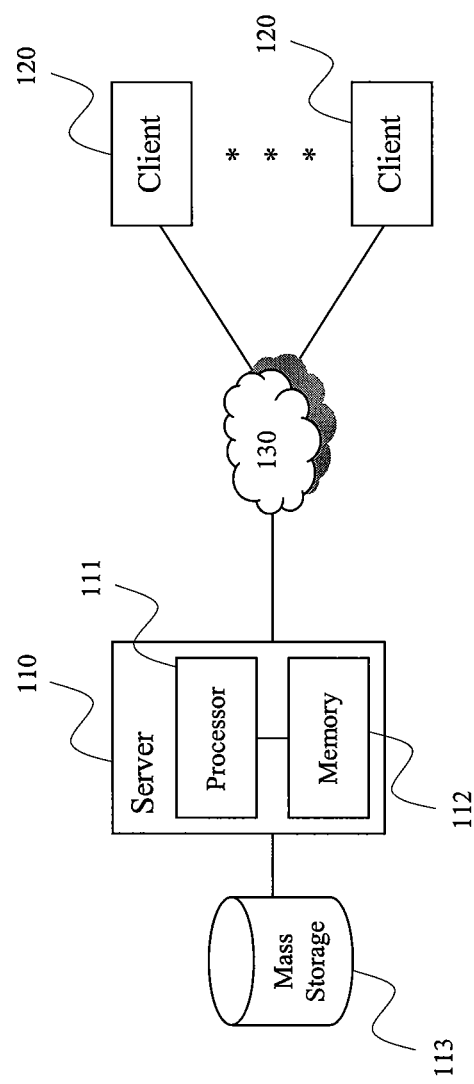
FIG. 1 illustrates a networked computer environment in which systems and methods according to embodiments of the present invention may be implemented.

FIG. 1 illustrates a networked computer environment in which systems and methods according to embodiments of the present invention may be implemented. As shown, the networked computer environment includes a server computer 110 and a plurality of client computers 120 (only two of which are shown). The server computer 110 and the client computers 120 are connected over a computer network 130, e.g., the Internet. The components of the server computer 110 that are illustrated in FIG. 1 include a processor 111 and a system memory 112. The server computer 110 is connected to a mass storage unit 113 that stores the contents managed by the server computer 110. Each client computer 120 includes conventional components of a computing device, e.g., a processor, system memory, a hard disk drive, input devices such as a mouse and a keyboard, and output devices such as a monitor (not shown).

The server computer 110 is programmed to operate as a network server that communicates with the client computers 120. In the embodiments of the present invention described herein, the server computer 110 is programmed as a web server that communicates with the client computers 120 using the TCP/IP protocol, and hosts a web site that can be accessed by the client computers 120. The client computers 120 are programmed to execute web browser programs and access the web pages managed by the server computer 110 by specifying a uniform resource locator (URL) for the server computer 110 into the browser.

The server computer 110 manages the contents stored in the mass storage unit 113 using a relational database software. The contents include profile data of the registered users of the web site. The profile data specify: user ID, password, name, e-mail, address including zip code, gender, marital status, date of birth, occupation, a pointer to an image file, various permission settings, and other similar data. The contents further include interview questions, multimedia files such as image files, video files, audio files and flash animation files, life stories posted by the users, commentaries made to the posted life stories, user-defined private circle data, and such other data needed by the server computer 110 to process data received from the users and render web pages requested by the users.

In the embodiments of the present invention described below, users are respectively operating the client computers 120 that are connected to the server computer 110 over the Internet. Also, web pages that are displayed to a user are transmitted from the server computer 110 to that user's client computer 120 and processed by the web browser program stored in that user's client computer 120 for display through the monitor of that user's client computer 120.

Figure 2:
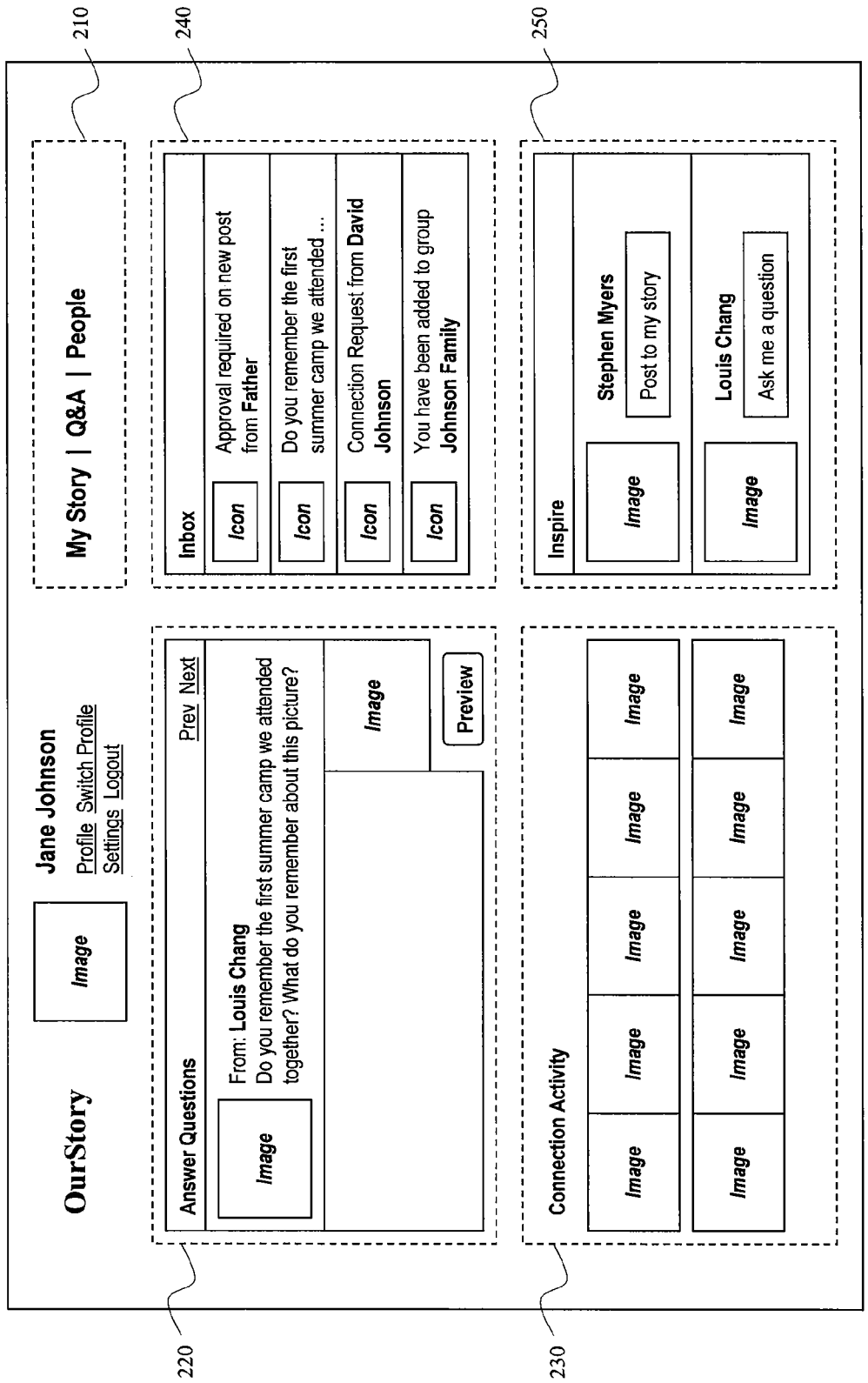
FIG. 2 is a schematic representation of a sample web page that is displayed to a user when the user logs into the web site that manages many of the features of the present invention.

FIG. 2 is a schematic representation of a web page that is generated by the server computer 110 and transmitted to a user for display when the user accesses the web site managed by the server computer 110, and logs in using his or her user ID and password. The web page identifies the web site "OurStory" and the user who logged in with the user's name (Jane Johnson) and the user's image. The user can access her life stories by accessing the My Story hyperlink provided in a navigation section 210 of the web page. Other hyperlinks are provided on the web page to allow the user to view and change her profile (Profile hyperlink) and the account settings (Settings hyperlink).

The web site permits a single registered user to keep multiple profiles and maintain life stories for each person, group, and sometimes fictional characters, represented in the profiles. This feature may be used in situations where it is preferred to write the life stories from a third person point of view, or for a group of people (e.g., the Smith family or the 1980 U.S. Olympic hockey team) or a fictional character, or where the subject of the life stories is not computer savvy. The Switch Profile hyperlink is provided to users who are maintaining multiple profiles to allow such users to switch to another profile and view and manage the life stories of the person, group, or fictional character represented in the other profile.

The web page further provides various other graphical user interface (GUI) elements. They include a navigation section 210, a question section 220, an image gallery 230, an inbox 240, and a collaboration section 250.

The navigation section 210 includes hyperlinks to web pages that are used to view, modify or add to the user's life stories (My Story), interview questions (Q&A), and relationships (People).

The question section 220 displays the most recent question that has been posed to the user and various other information associated with the question, including the name and image of the person asking the question, any image attached to the question by the person, and a text input field in which the user can answer the question. The question section 220 also provides question navigation hyperlinks "Previous" and "Next" using which the user can turn to the previous question or the next question that is in the queue of questions that have been posed to this user. The input of the answer followed by a click on the Preview button causes the display of a preview web page similar to the one shown in FIG. 3F, using which the user can either publish the answer as a life story or cancel it. If the user publishes the answer, the server computer 110 saves the answer and the associated image in the mass storage unit 113. Further, in response to either the publishing or canceling action, the next question in the queue is displayed to the user. The user may also delete a question from the queue of questions by clicking on the "Delete" hyperlink. In response to this action, the next question in the queue is displayed to the user.

The image gallery 230 provides the user with a pictorial snapshot of the more recent activities by persons who are connected to the user or by those who belong to a special group defined by the user, e.g., the user's immediate family or the user's closest friends. The activities that are tracked by the image gallery 230 include recent posts of life stories by the connected users or members of the special group and recent comments made by them to the user's life stories. The image gallery 230 may also include recent instructional, informational, and inspirational posts submitted by other users and system generated content that are posted to encourage users to post their life stories. A click on any image hyperlinks the user to the thread corresponding to that image. A "thread" consists of a post and any comments made concerning the post.

The inbox 240 displays messages generated by the web site in response to actions taken by the other users of the web site. The messages include notices of actions taken by other users (e.g., "You have been added to group Johnson Family") and summaries of tasks that the user has been asked to complete (e.g., "Approval required on new post from Father" and "Connection Request from David Johnson"). An icon is displayed alongside each message to help the user quickly identify the content of the message.

The collaboration section 250 provides hyperlinks to a web page used to post a life story on behalf of another user and a web page used to ask questions to another user. The identity of the other user is displayed in this section along with that person's image. Only those users who have given the user sufficient access rights will appear in this section. In the example given here, Jane Johnson has the right to post stories on behalf of Stephen Myers, and Jane Johnson has the right to ask Louis Chang questions.

Figure 3A:
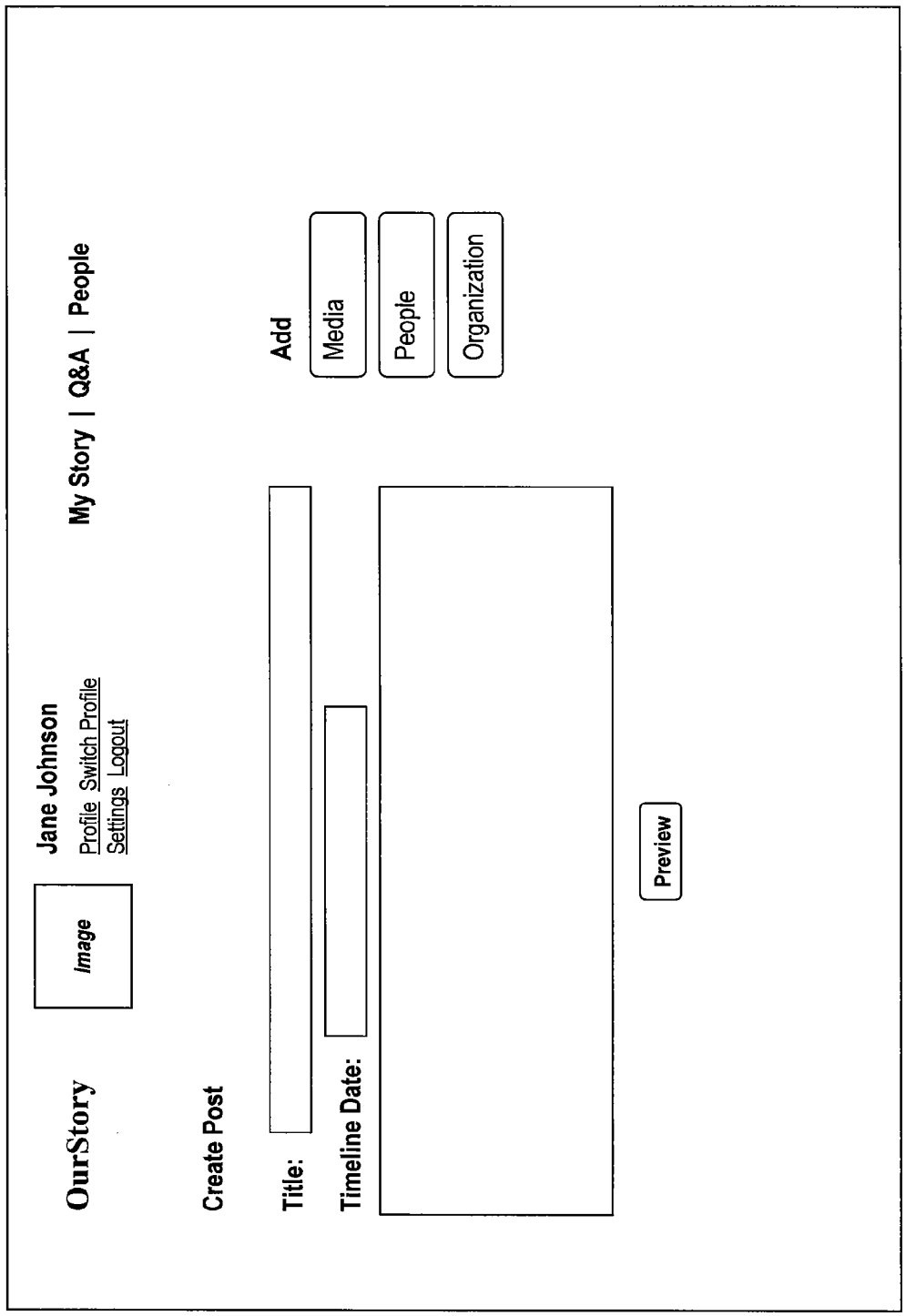

FIG. 3A is a schematic representation of a GUI that is used for posting life stories. This GUI includes input fields for the title, the date, and the word description for the post. It also includes hyperlinks to web pages for adding media to the post (Media), identifying persons or groups who are part of the story (People), and specifying additional information such as locations and keywords (Organization). The media that is added may be any of the following: (i) images that the user uploaded, (ii) images others have uploaded and shared with the user, (iii) images that are retrieved from an image search conducted on the web based on the context of the post, (iv) images from third party photo sharing sites, (v) video files, (vi) audio files, and (vii) flash animation files.

Figure 3B:
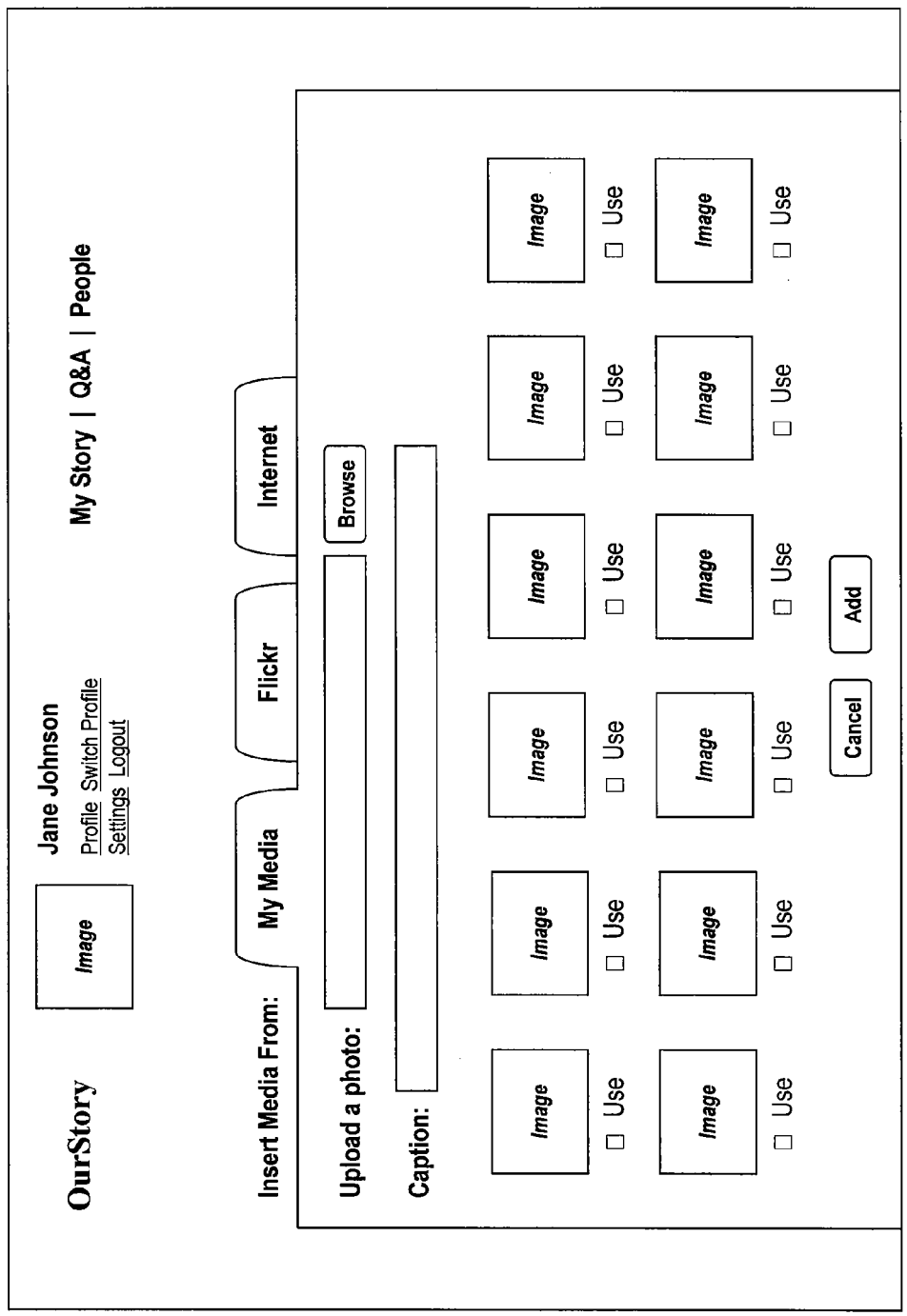
Figure 3C:
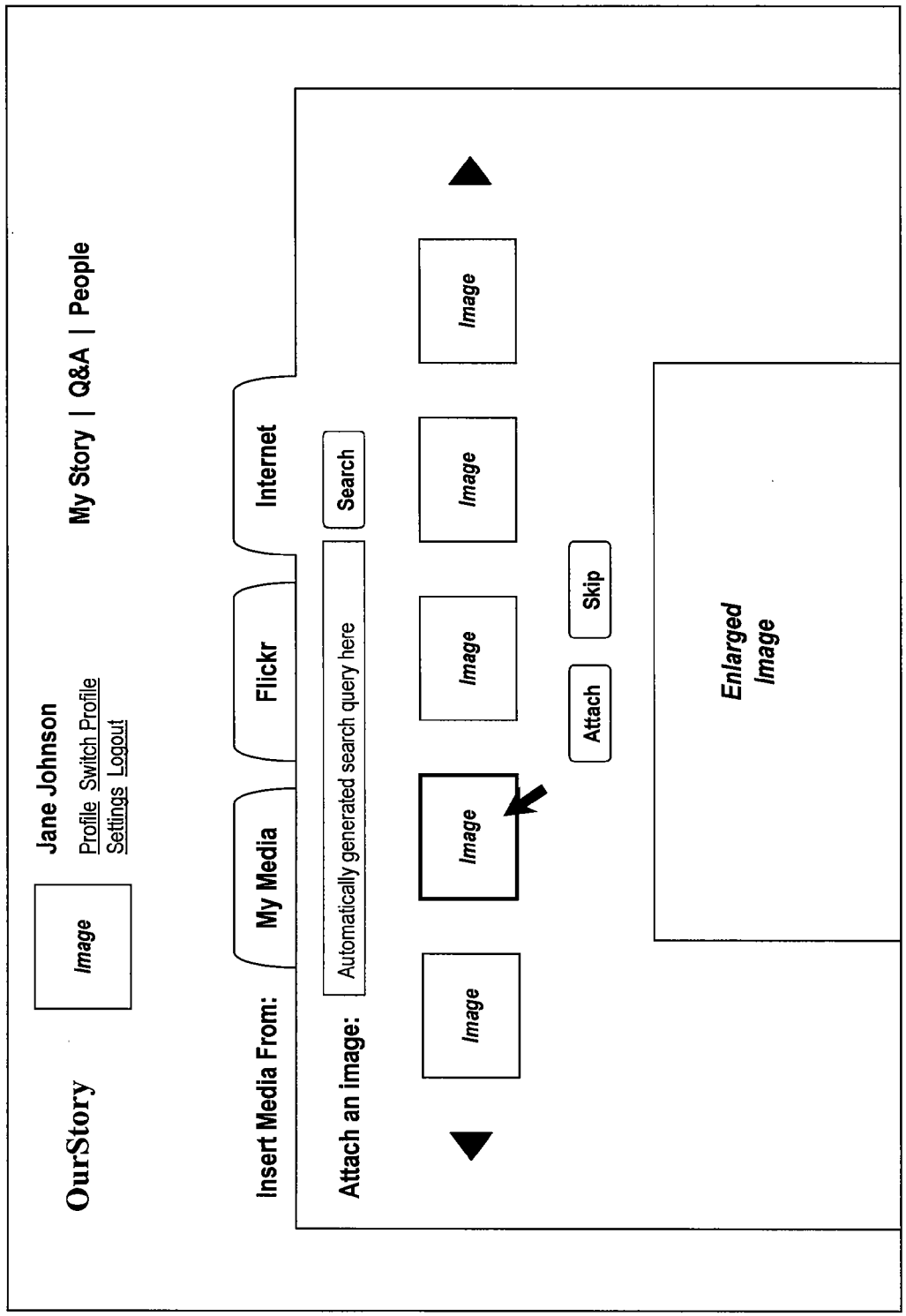

FIGS. 3B and 3C are schematic representations of the web page for adding media to the post. Three tabs are provided on this page. They are "My Media," "Flickr," and "Internet." FIG. 3B is the web page that is displayed to the user when the My Media tab is selected. FIG. 3C is the web page that is displayed to the user when the Internet tab is selected. The web page of FIG. 3B provides the user the option to upload a new photo and insert a caption for that photo, or use one of the photos that have been previously uploaded into the user's account. The web page of FIG. 3C provides the user with the option of selecting one of the images retrieved from an Internet image search. The query for the Internet image search is automatically generated from the text narrative of the post using a conventional contextual search query generator.

Figure 3D:

FIG. 3D is a schematic representation of the web page for marking the post with character tags, which are tags that are defined with respect to those persons that are depicted in the text narratives and images. Each character tag is associated with either a user profile or a pseudo-profile. A pseudo-profile typically includes a person's name, and may also include the person's e-mail address and phone number. A pseudo-profile for a person is created by a user when the user does not know if the person has a user profile. FIG. 3D shows, on the left hand side, a list of users who are connected to the user and have user profiles. If any of these users are depicted in the post, the boxes next to their names are checked to indicate the user's intention to mark the post with tags associated with their user profiles. If there are persons depicted in the post and the user does not know if such persons have a user profile, the user has the option of entering the person's name and affiliation (e.g., friend or family) in the Characters input field. When the "Add" button is selected by the user, pseudo-profiles are created for those persons named in the Characters input field. In this example, the pseudo-profile includes the name of the character and affiliation of this character to the user who created it.

A post may also be tagged with the location depicted in the post and keywords defined by the user. The web page for inputting this data is shown schematically in FIG. 3E. When the "Add" button is selected by the user, the post is tagged with the location and keywords entered by the user.

The table below shows conceptually how the server computer 110 keeps track of the different tags that are associated with different posts or objects. The starred names under the column, "Character Tags," represent the persons for whom pseudo-profiles have been created.

| Object | Date | Keyword Tags | Character Tags | Location |
| --- | --- | --- | --- | --- |
| Post 1123 | Jun. 1, 1980 | childhood, baseball | Father, Jay Smith* | Miami, FL |
| Post 1124 | Oct. 10, 1998 | career, Internet | Louis Chang, Carl Jones* | Santa Clara, CA |
| Image 2122 | Aug. 5, 2001 | daughter, walking | Daughter, Wife, Mother | Sunnyvale, CA |
| Image 2123 | Dec. 11, 2003 | son, basketball | Father, Stephen Brown* | Sunnyvale, CA |

When the user selects the Add button or the Cancel button from the media, people, and organization web pages, shown schematically in FIGS. 3B-C, 3D, and 3E, respectively, the user is returned to the web page of 3A. When the user is finished with his or her inputs, the user clicks on the Preview button, in response to which a Preview Post web page like the one shown in FIG. 3F is displayed to the user. The user can specify permissions levels for viewing and commenting on this post on this web page. A public permissions level allows any user to view and comment on this post. A restricted permissions level allows only those users who are in the groups that have been checked to view and comment on this post. When the user clicks on the Publish button, the data relating to this post, including the word description, the attached media file, the permissions level settings, and other data specified using the web pages accessed through the Media, People and Organization hyperlinks, are transmitted to the server computer 110 along with data that identifies the person who is the subject of this life story. The identifying data may be the user ID of the person submitting the life story or the user ID of the person on behalf of whom the life story is submitted. In the case where a single user is maintaining multiple profiles and their stories and the user is submitting a story for one of these profiles, the identifying data may be an ID corresponding to that profile.

Figure 4:
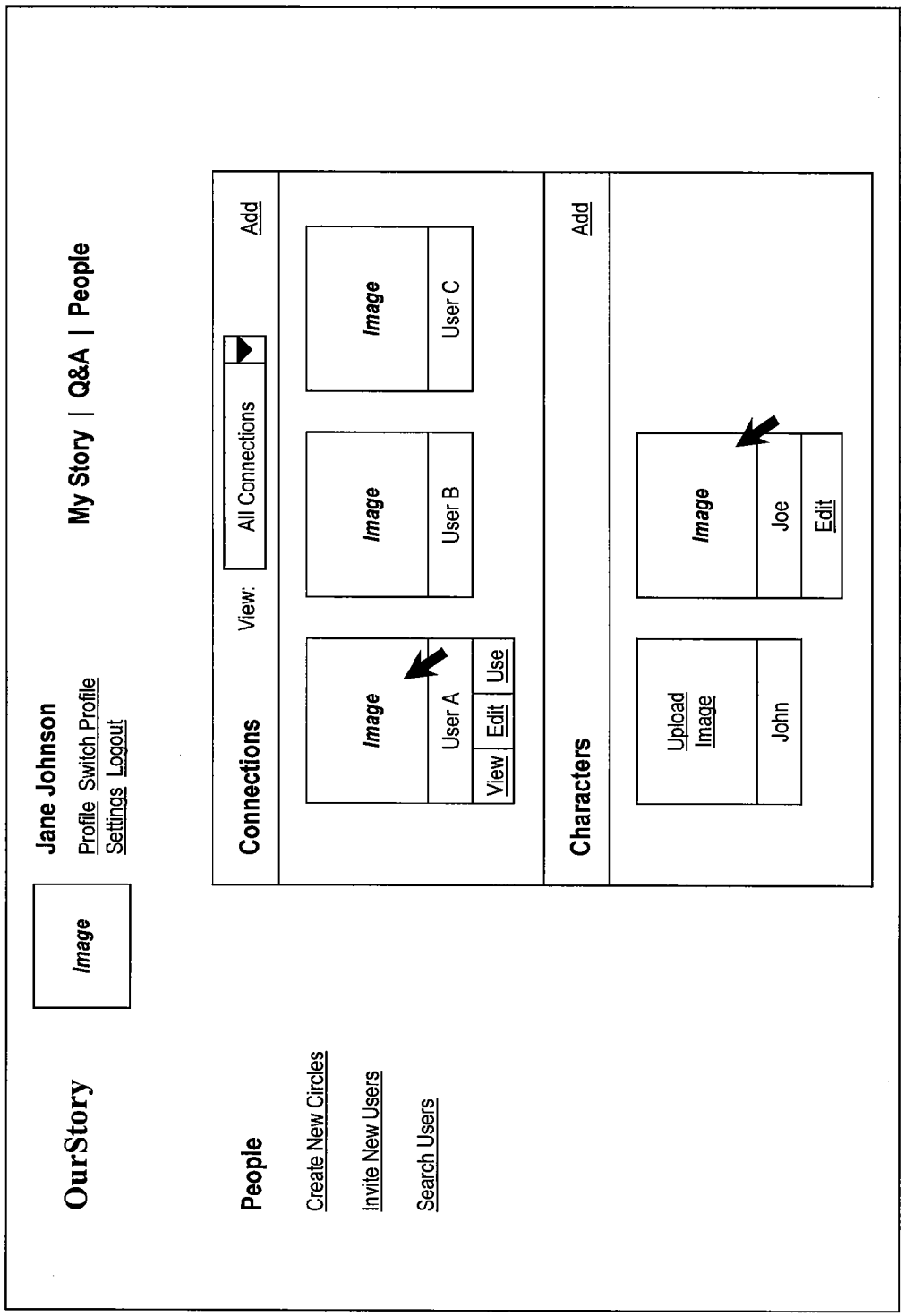
FIG. 4 is a schematic representation of a web page that is used in managing a user's connections.

FIG. 4 is a schematic representation of the web page that is generated by the server computer 110 and transmitted to a user for display when the user selects the People hyperlink from the navigation section 210. The web page provides hyperlinks to web pages for defining new private circles, and populating them with users (Create New Circles), managing invitations (Invite New Users), and performing searches of other registered users of the web site (Search Users). It also includes an image gallery of users who are connected to the user, and characters created by the user. A connection to the user by another user exists or can be made by: (i) the user was invited by the other user or invited the other user onto the web site; or (ii) the user places the other user into one of his or her circles.

The users shown in the Connections window of the web page in FIG. 4 represent all users of the web site that are connected to the user. The View drop-down menu includes selections of user-defined private circles. The members that are displayed in the Connections window may be changed based on the selection made using the View drop-down menu. Also, once the display has changed to a selected private circle, other users may be added to the private circle through the Add hyperlink.

When a mouse pointer hovers over a user name or image displayed inside the Connections window, three selectable hyperlinks (View, Edit and Use) appear at the bottom of the user's name. The View hyperlink accesses the My Story web page of this user. The Edit hyperlink allows this user's displayed name or image to be changed. The Use hyperlink accesses the GUI of FIG. 3A using which a life story may be posted on behalf of this user.

The users shown in the Characters window of the web page in FIG. 4 represent those persons for whom pseudo-profiles have been created. An image may or may not be available. If an image is not available, an Upload Image hyperlink is displayed. When a mouse pointer hovers over a name or image displayed inside the Characters window, an Edit hyperlink appears at the bottom of the user's name. The Edit hyperlink is accessed to edit the name of the character, upload an image, or to edit or enter other pseudo-profile data, e.g., e-mail address and telephone number.

Figure 5:
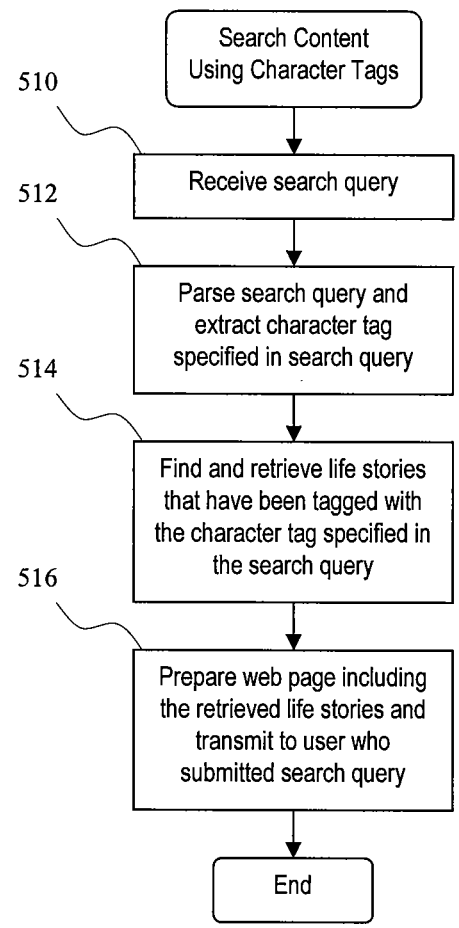
FIG. 5 is a flow diagram that illustrates the method steps carried out by the server computer in response to a search request that contains character tags.

FIG. 5 is a flow diagram that illustrates the method steps carried out by the server computer 110 in response to a search request that contains character tags. In the example given herein, User A is submitting the search request and, in response, the server computer 110 will search all life stories that User A is permitted to access. The search query submitted by User A is received by the server computer 110 (step 510) and then parsed (step 512) so as to extract the one or more character tags specified in the search query. In step 514, the server computer 110 finds and retrieves those life stories accessible by User A that have been tagged with the character tags extracted from the search query. In step 516, the server computer 110 prepares a web page including the retrieved life stories and transmits the web page to the user who submitted the search query.

Figure 6:
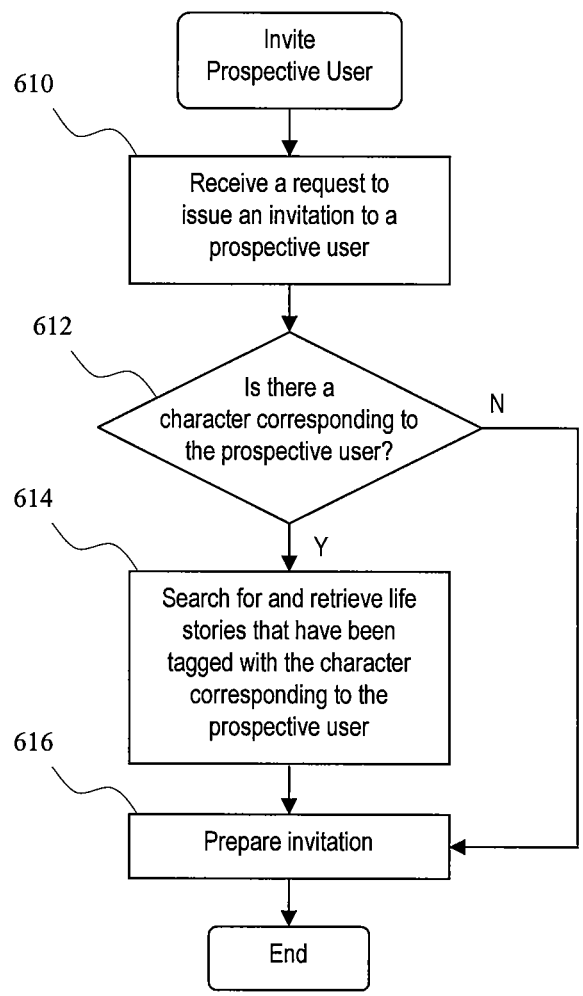
FIG. 6 is a flow diagram that illustrates the method steps carried out by the server computer in response to a request to issue an invitation.

The search conducted in FIG. 5 may be narrowed in various ways. For example, the search may be limited to the life stories that User A has submitted. This is the case in the process illustrated in FIG. 6, which is a flow diagram that illustrates the method steps carried out by the server computer 110 in response to a request to issue an invitation. In the example given herein, User A is submitting the request to issue an invitation to a character named Jay Smith. Upon receiving this request (step 610), the server computer 110 first searches User A's character list to see if User A has created a pseudo-profile for Jay Smith (step 612). If so, the flow proceeds to step 614, where the server computer 110 performs a search for all life stories submitted by User A that are tagged with the character tag for Jay Smith. Then, in step 616, the server computer 110 prepares an invitation e-mail to Jay Smith and includes in the invitation e-mail hyperlinks to the life stories that the search returned in step 614. Alternatively, the invitation e-mail may contain the life stories that the search returned in step 614. If User A has not created a pseudo-profile for Jay Smith, the search step in 614 is bypassed and the invitation e-mail is sent to Jay Smith without any life story content.

Figure 7:
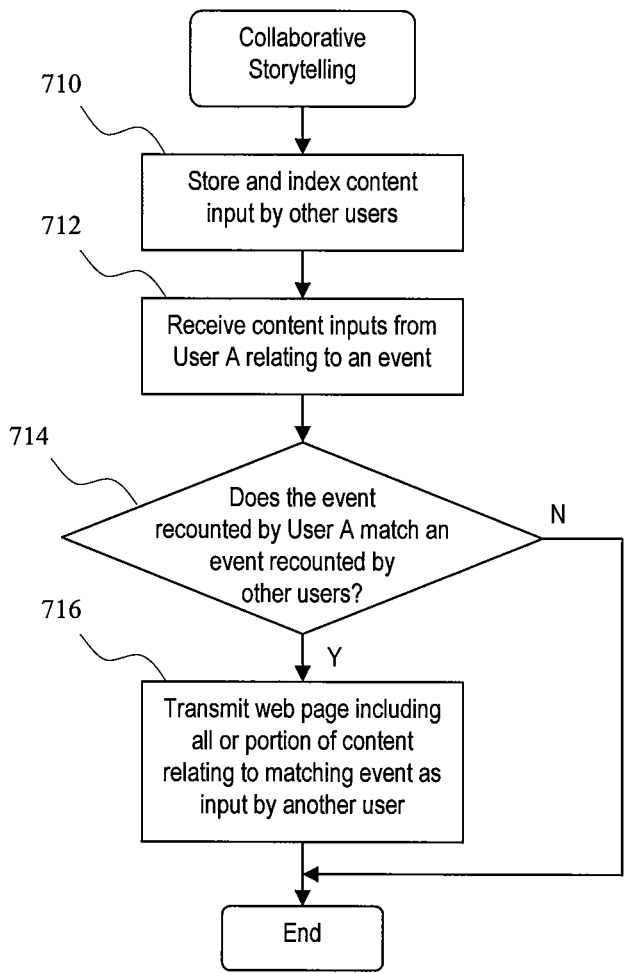
FIG. 7 is a flow diagram that illustrates the method steps carried out by the server computer to enable a collaborative storytelling process.

FIG. 7 is a flow diagram that illustrates the method steps carried out by the server computer 110 to enable a collaborative storytelling process between two users. In the example given herein, User A is recounting an event and the server computer 110 searches events recounted by other users to see if the event recounted by User A potentially matches any of the events recounted by other users. If there is a potential match, a web page is prepared including all or portion of the content relating to the matching event that another user has posted, and transmitted to User A.

Step 710 of the process illustrated in FIG. 7 represents the storing and indexing by the server computer 110 of content relating to various events that has been input by other users. In step 712, the server computer 110 receives content inputs relating to a particular event from User A. The particular event recounted by User A is then compared with the events recounted by the other users for a potential match in step 714. The algorithm used for determining whether there is a potential match is described in conjunction with FIG. 8. If a potential match is found, a web page including some or all of the content relating to this event as input by another user is prepared and transmitted to User A (step 716). If a potential match is not found, step 716 is bypassed and the process ends.

Figure 8:
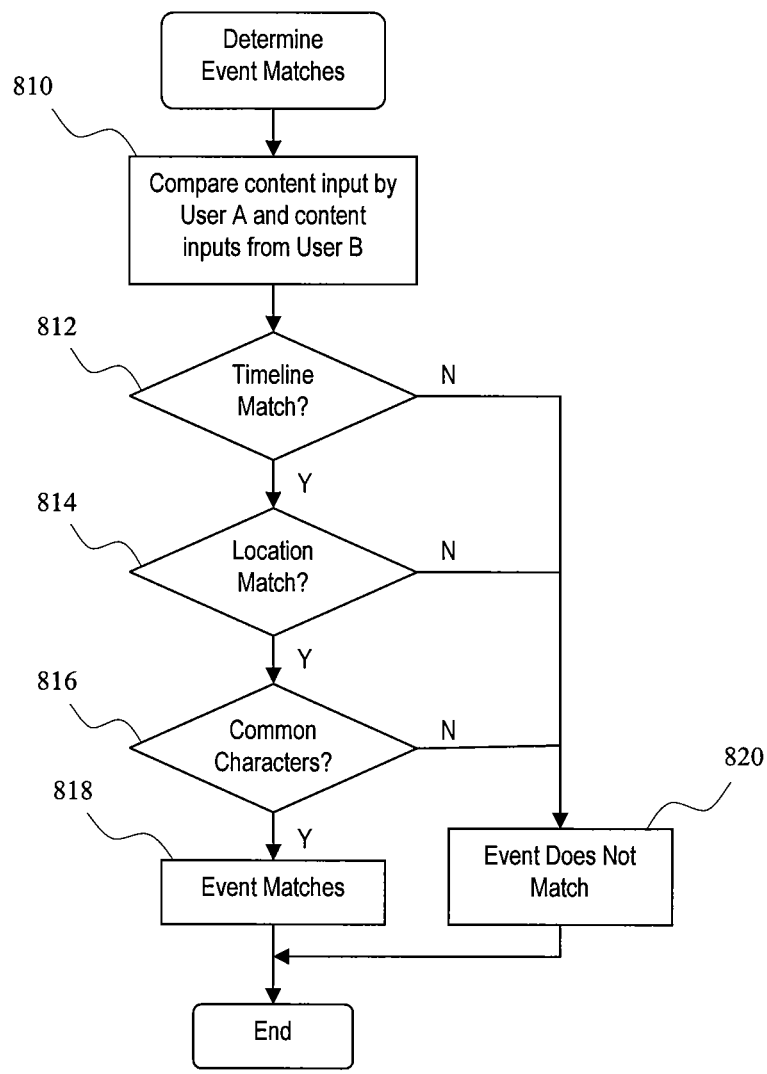
FIG. 8 is a flow diagram that illustrates the method steps carried out by the server computer to determine matches between two events.

FIG. 8 is a flow diagram that illustrates the method steps carried out by the server computer 110 to determine whether there is a potential match between two events. In the example given herein, the two events are Event A and Event B, and content relating to Event A is input by User A and content relating to Event B is input by User B. The process begins with step 810, where the content relating to Event A is compared with the content relating to Event B. In particular, the dates and the location of the two events are compared (steps 812 and 814), and characters depicted in the two events are compared to see if there is at least one common character depicted in both events (step 816). The characters depicted in the two events may be compared by examining the names, e-mail addresses, and/or telephone numbers associated with the characters. If there is a match of the dates and location and there is at least one common character depicted in both events, it is determined that the two events potentially match (step 818). Otherwise, it is determined that the two events do not match (step 820).

While particular embodiments according to the invention have been illustrated and described above, those skilled in the art understand that the invention can take a variety of forms and embodiments within the scope of the appended claims.

What is claimed is:

1. A method comprising:
   receiving via a social network website a photo image relating to an event for storage, the social network website including a profile of a first individual;
   receiving via the social network website a pseudo-profile from the first individual of a second individual when the second individual lacks registration with a computer system;
   associating the photo image with the first individual depicted in the photo image, wherein the first individual is a registered user of the computer system;
   associating the photo image with the pseudo-profile of the second individual that is depicted in the photo image, wherein the associating the photo image with the pseudo-profile of the second individual is performed using a tag defined by the first individual, the tag identifying the second individual, wherein associating the photo image with the pseudo-profile of the second individual is performed to enable the photo image to be organized using the tag;
   receiving a request to issue an invitation to the second individual to establish a connection with the first individual;
   searching for the photo image based on the tag and the request to determine the pseudo-profile of the second individual;

determining information within the pseudo-profile; and sending the invitation with a link to the social network website to the second individual depicted in the photo image based on the information within the pseudo-profile.

2. The method according to claim 1, wherein the pseudo-profile of the second individual is created by the first individual, wherein the information within the pseudo-profile includes at least one of: (i) name, (ii) e-mail address, and (iii) telephone number, of the second individual.

3. The method according to claim 2, further comprising receiving inputs from the first individual prior to said storing the photo image related to the event, the inputs specifying the photo image, keywords descriptive of the event, location of the event, date of the event, and at least one character in the event, wherein the photo image is also associated with said keywords, said location, said date, and said at least one character.

4. The method according to claim 1, further comprising associating the photo image with a third individual depicted in the photo image, wherein the third individual is a registered user of the computer system.

5. The method according to claim 1, further comprising:

generating the invitation to include information representative of said photo image.

6. The method of claim 1, further comprising:

receiving a request for the photo image relating to the second individual; and retrieving the photo image, using the tag, for the second individual that is associated with the event in response to the request for the photo image, wherein sending the invitation is performed to invite the second individual to view the photo image.

7. The method according to claim 1, wherein the pseudo-profile of the second individual is created by the first individual, wherein the information within the pseudo-profile includes at least one of an email address and a telephone number of the second individual.

8. A method comprising:

receiving via a social network website a photo image associated with a first individual, the social network website including a profile of the first individual;

generating a web page for a computer system having a computer server and transmitting the web page to a client device for display, the client device operated by the first individual, wherein the webpage is configured to display the photo image associated with the first individual relating to an event, wherein the first individual is a registered user of the computer system;

receiving via the social network website a pseudo-profile of a second individual from the first individual when the second individual lacks registration with the computer system;

associating the photo image with the pseudo-profile of the second individual using a tag defined by the first individual, the tag for identifying the second individual, wherein associating the photo image with the pseudo-profile of the second individual is performed to enable the photo image to be organized using the tag;

receiving a request to issue an invitation to the second individual;

searching for the photo image based on the tag and the request to determine the pseudo-profile of the second individual;

determining information within the pseudo-profile; and sending the invitation with a link to the social network website to the second individual depicted in the photo image based on the information within the pseudo-profile.

9. The method of claim 8, further comprising adding additional content that relates to the event, wherein the additional content includes an additional tag associating the event with at least one person, wherein the adding additional content is performed by the second individual.

10. The method of claim 9, further comprising sending an invitation to the at least one person associated with the event by the additional tag to view the additional content relating to the event in the web page.

11. The method of claim 8, further comprising:

receiving a request from the second individual for the photo image relating to the second individual; and retrieving the photo image for the second individual using the tag for viewing by the second individual, wherein sending the invitation is performed to invite the second individual to view the photo image.

\* \* \* \* \*